United States Patent
Heckenberger et al.

(10) Patent No.: US 9,126,282 B2
(45) Date of Patent: Sep. 8, 2015

(54) METHOD FOR A FLUID-TIGHT CONNECTION OF TWO COMPONENTS FOR PRODUCING A FLUID-TIGHT COOLING UNIT

(75) Inventors: Thomas Heckenberger, Leinfelden-Echterdingen (DE); Stefan Hirsch, Stuttgart (DE); Florin Moldovan, Stuttgart (DE); Christoph Fehrenbacher, Stuttgart (DE); Hans-Georg Herrmann, Saarbruecken (DE)

(73) Assignee: MAHLE Behr GmbH & Co. KG, Stuttgart (DE)

( * ) Notice: Subject to any disclaimer, the term of this patent is extended or adjusted under 35 U.S.C. 154(b) by 781 days.

(21) Appl. No.: 13/346,010

(22) Filed: Jan. 9, 2012

(65) Prior Publication Data

US 2012/0174402 A1   Jul. 12, 2012

Related U.S. Application Data

(63) Continuation of application No. PCT/EP2010/059537, filed on Jul. 5, 2010.

(30) Foreign Application Priority Data

Jul. 7, 2009   (DE) .................. 10 2009 032 193

(51) Int. Cl.
*B23K 1/20* (2006.01)
*B21D 53/04* (2006.01)
*B23P 15/26* (2006.01)

(52) U.S. Cl.
CPC . *B23K 1/20* (2013.01); *B21D 53/04* (2013.01); *B23P 15/26* (2013.01); *Y10T 29/49366* (2015.01); *Y10T 29/49393* (2015.01)

(58) Field of Classification Search
CPC ........ B23K 1/20; B23K 1/0012; B23D 53/04; B23P 15/26; F28F 3/04; F28D 9/0043; F28D 9/0075; Y10T 29/49393; Y10T 29/49366
See application file for complete search history.

(56) References Cited

U.S. PATENT DOCUMENTS 3,995,310 A    11/1976   Koenig
4,516,632 A *  5/1985   Swift et al. ............. 165/167

(Continued)

FOREIGN PATENT DOCUMENTS

| CN | 1328632 A | 12/2001 |
| DE | 25 57 371 A1 | 6/1976 |
| DE | 195 28 116 A1 | 2/1997 |
| DE | 10 2007 048 206 A1 | 4/2009 |
| EP | 1 136 782 A1 | 9/2001 |

(Continued)

OTHER PUBLICATIONS

Chinese Office Action for Chinese Application No. 201080030701.X dated Dec. 30, 2013 with English translation.

*Primary Examiner* — Sarang Afzali
(74) *Attorney, Agent, or Firm* — Muncy, Geissler, Olds & Lowe, P.C.

(57) ABSTRACT

A method for connecting two components in a fluid-tight manner for producing a fluid-tight unit is provided. The method includes a step of providing at least one first component that is solder-plated on one side, wherein the first component has a cutting burr on a side facing away from the solder-plated surface. The method further includes a step of connecting, in particular soldering, the first component to a second component in a fluid-tight manner, in order to produce the fluid-tight unit, wherein the solder-plated surface of the first component faces the second component when connecting the first and second components in a fluid-tight manner.

4 Claims, 5 Drawing Sheets

(56) References Cited

U.S. PATENT DOCUMENTS

| | | | |
|---|---|---|---|
| 5,699,856 A * | 12/1997 | Merle | 165/166 |
| 5,836,383 A | 11/1998 | Zwittig | |
| 6,959,492 B1 | 11/2005 | Matsumoto et al. | |
| 2003/0145465 A1 | 8/2003 | Anders et al. | |
| 2008/0128474 A1* | 6/2008 | Damsohn | 228/185 |

FOREIGN PATENT DOCUMENTS

| | | |
|---|---|---|
| JP | 2001-215093 A | 8/2001 |
| JP | 2007-529707 A | 10/2007 |
| NL | 1 020 749 C2 | 12/2003 |
| NL | 1020749 C2 | 12/2003 |
| WO | WO 2005/080901 A1 | 9/2005 |

* cited by examiner

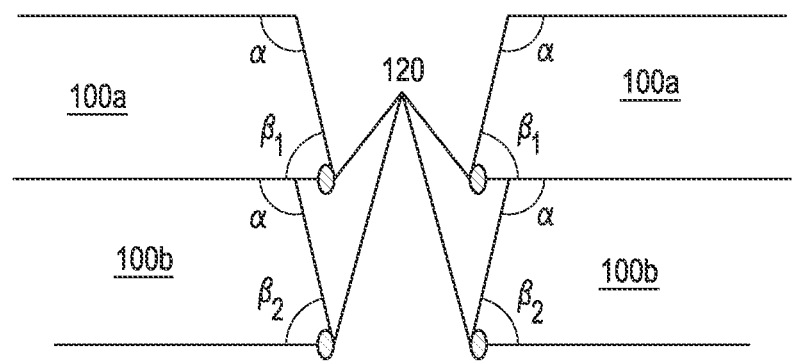
FIG.5
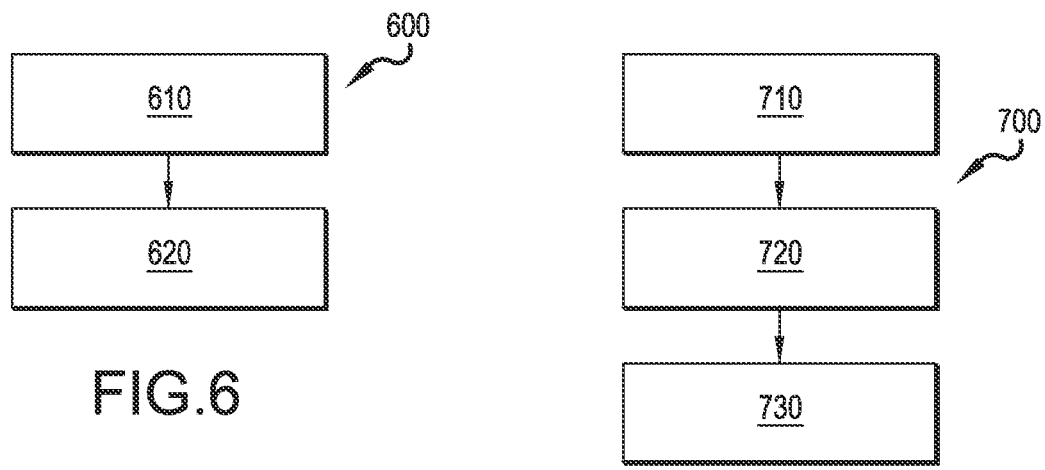
FIG.6
FIG.7

ND FOR A FLUID-TIGHT
CONNECTION OF TWO COMPONENTS FOR
PRODUCING A FLUID-TIGHT COOLING
UNIT

This nonprovisional application is a continuation of International Application No. PCT/EP2010/059537, which was filed on Jul. 5, 2010, and which claims priority to German Patent Application No. DE 10 2009 032 193.4, which was filed in Germany on Jul. 7, 2009, and which are both herein incorporated by reference.

BACKGROUND OF THE INVENTION

1. Field of the Invention

The present invention relates to a method for the fluid-tight connection and a cooling unit.

2. Description of the Background Art

In the field of heat exchanger technology, metal sheets or other components are connected together, particularly soldered, to produce cooling tubes or other heat exchanger components. A composite made of a plurality of metal sheets lying one on top of another, which are connected by soldering into a solid and fluid-tight unit, is suitable for different applications, inter alia, for the production of complex channel or bearing structures for heating or cooling tasks, for example, for the cooling of battery cells.

A method for producing a heat exchanger with a plate sandwich structure is described, for example, in German Offenlegungsschrift No. DE 195 28 116 B4, which corresponds to U.S. Pat. No. 5,836,383. During the production of the structures, the mechanical cutting processes inevitably produce burrs in the individual sheets. These burrs are counterproductive for the subsequent soldering, because the burrs act as spacers between the sheets. Relatively small gaps in this case can also lead to faulty soldering or to leakiness. Burrs must therefore be removed mechanically. This is time-consuming and therefore costly. If the burrs are on the solder-plated side, the solder is also removed by this.

Further, for economic reasons, sheets solder-plated in a planar manner are used, which can lead locally to a surplus of solder and thereby to undesirable narrowing or obstructions in the channels.

SUMMARY OF THE INVENTION

It is therefore an object of the present invention to provide an improved method for the fluid-tight connection of two components for producing a fluid-tight unit and a cooling unit. In this regard, the disadvantages in the state of the art should be avoided and at the same time more economic solutions than in the state of the art provided.

The present invention provides a method for the fluid-tight connection of two components for producing a fluid-tight unit, whereby in an embodiment, the method comprises the following steps: providing at least one first component that is solder-plated on one side, whereby the first component has a cutting burr on a side facing away from the solder-plated surface; and fluid-tight connection, particularly soldering, of the first component to a second component to produce the fluid-tight unit, whereby in the fluid-tight connection of the first and second components, the solder-plated surface of the first component faces the second component.

This type of embodiment of the invention is based on the realization that a component need to be solder-plated only on one side and can be cut in such a way that a remaining burr is left on the side that has not been solder-plated. This burr then no longer hinders the solder connection, so that a fluid-tight connection between the two components can be produced. The advantage of this type of an embodiment of the invention is that deburring of the first component can be omitted because of beneficial preprocessing. This avoidance of a process step has a cost-saving effect. Further, the situation can be avoided that solder in the applied solder plating is removed by deburring and as a result solder sufficient for the connection may no longer be present.

The present invention furthermore provides a method for the fluid-tight connection of two components for producing a fluid-tight unit, whereby the method comprises the following steps: provision of at least one first component, which has a cutting burr on a main surface; joining of the first component to at least one second component, whereby the joining occurs in such a way that a main surface of the second component is in contact with the main surface of the first component and the cutting burr is arranged by at least a predefined distance from a side surface of the second component; and fluid-tight connection, particularly soldering of the first and second components to produce the fluid-tight unit.

This type of embodiment of the present invention is based on the realization that a projection of the part of the first component with the burr is achieved in the joining of the first component to the second component. The cutting burr can therefore not cause an undesirable gap between the first and second component, which could prevent or at least interfere with a fluid-tight connection of both components. The advantage of this type of embodiment is that now the need for a process step of deburring can be avoided owing to a small additional material consumption in the form of a projection with the cutting burr. As a result, the production costs for a fluid-tight unit can be reduced.

Particularly in the joining step, the cutting burr can be arranged on the main surface of the first component at a distance of 0.5 mm to 3 mm from the side surface of the second component. This type of embodiment of the present invention assures that the cutting burr has no effect on the fluid-tight connection of the first to the second component. It can be assured at the same time that the additional material consumption is not increased too greatly by the provision of the projection.

In another embodiment of the invention, the joining step can be carried out in such a way that the side surface of the second component substantially forms an angle of 90° with the main surface of the first component or a main surface of another component. This type of embodiment of the present invention offers the advantage that a strong and/or secure solder meniscus can form reliably.

Further, the present invention provides a method for the fluid-tight connection of two components for producing a fluid-tight unit, whereby the method comprises the following steps: provision of a first component with a conical side cut, whereby the first component has a cutting burr, which projects from the main surface of the first component that has a smaller angle to the side cut; provision of a second component with a conical side cut, whereby the second component has a cutting burr, which projects from the main surface of the second component that has a smaller angle to the side cut; and fluid-tight connection of the first component to the second component to produce the fluid-tight unit, whereby the cutting burr of the first component is aligned substantially with the cutting burr of the second component and the cutting burr of the second component is arranged on the main surface of the second component, said surface facing away from the first component.

This type of embodiment of the present invention is based on the realization that during the conical cutting of the first and second components a cutting burr is formed, which is arranged on an outermost cutting edge. If two components, both of which are cut conically, are now layered on top of one another in such a way that the cutting burrs are arranged substantially above one another, an undercutting, which enables a secure fluid-tight connection between the first and second components, can be achieved by the conical cut, particularly in the second component. In particular, no unwanted gap between the first and second component, which could prevent or interfere with a fluid-tight connection between the first and second component, would then be caused by the cutting burr of the first component.

The present invention according to the above-described embodiments is based on the consistent inventive idea that the need to cut no longer produces a cutting burr to be removed, but before or during the connection of the two components is kept out of the gap between the first and second component. This can occur, on the one hand, in that the cutting burr is oriented toward a side facing away from the connecting joint between the first and second components or that the cutting burr projects laterally from one of the two components so far that it cannot act as a spacer in the connecting zone.

Additionally, the present invention provides a method for the fluid-tight connection of two components for producing a fluid-tight unit, whereby the method comprises the following steps: provision of at least one first component, which has at least one recess or opening; provision of at least one second component, which has solder plating at least on one side, whereby the solder plating has a plating opening in at least one area; joining of the first component to a second component, whereby the recess or opening of the first component is aligned with the plating opening of the second component; and fluid-tight connection, particularly soldering, of the first component to the second component to produce the fluid-tight unit.

This type of embodiment of the present invention offers the advantage that a narrowing of a channel, formed by the opening or the recess of the first component in conjunction with the second component, by melting solder running into the channel can be prevented. This occurs in a simple manner by the removal of the solder plating on the second component in the areas that are to lie opposite after the joining of the recesses or openings of the first component. In this way, the desired form can be reliably assured also during the production of small capillary channels. This type of embodiment of the invention offers the advantage that higher rejection rates can be prevented by a simple and cost-effective measure during the production of the fluid-tight unit.

The present invention also provides a method for the fluid-tight connection of two components for producing a fluid-tight unit, whereby the method comprises the following steps: provision of at least one first component; and provision of a second component which has at least one recess, whereby the recess is sized such that a contact area between the first and second components has at most a lateral dimension of 10 mm; and fluid-tight connection, particularly soldering of the first and second components to produce the fluid-tight unit, whereby in the connection the first component is connected in the contact area in a bonding manner to the second component and in an area of the recess the first component is not connected in a bonding manner to the second component.

This type of embodiment of the present invention is based on the realization that a reliable and stable connection between the first and second components can be achieved, when the connection of the two components occurs over a contact area whose lateral dimension (i.e., whose dimension along the surface of the first and second components) is at most 10 mm. In particular, during soldering this measure can assure that soldering flux, which passes over into the gaseous state under the effect of heat, can definitely escape from the contact area and thus cause no gas inclusions in the contact area. The stability of the connection could be impaired by such gas inclusions. The advantage of such an embodiment of the present invention therefore is to produce a stable fluid-tight connection by a simple measure.

Approaches different from those described above can also be combined advantageously. In such an embodiment of the invention, the method for the fluid-tight connection of two components for producing a fluid-tight unit may have steps according to a first of the approaches recited above and further have at least one other step according to another of the approaches recited above. For example, a first component can be used, which has solder plating on one side and a cutting burr on a side opposite to the solder plating and at the same time a second component can be used, which has a cutting burr on a projection, so that no unwanted gap between the first and second component is produced during soldering by both cutting burrs.

It is especially advantageous, when a cooling unit for an energy storage cell is produced by the carrying out of the steps of an above-described method. In this case, the cooling unit, which has at least one fluid-tight connection, can be produced cost-effectively and with a simple construction and has in addition a reliable tightness in the fluid-tight connection.

The approaches proposed above increase the likelihood of defect-free soldering or offer, among others, economic advantages in the preparation or production of individual parts and in the case of a completely soldered part. Therefore, burrs need no longer be removed during the production of the fluid-tight unit. Further, channel obstructions by excess solder can be avoided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 5 shows a sectional view of a section of a fluid-tight unit, which was produced with the use of another exemplary embodiment of the present invention;

FIG. 6 shows a flowchart of another exemplary embodiment of the present invention as a method;

FIG. 7 shows a flowchart of another exemplary embodiment of the present invention as a method;

DETAILED DESCRIPTION

Figure 1:
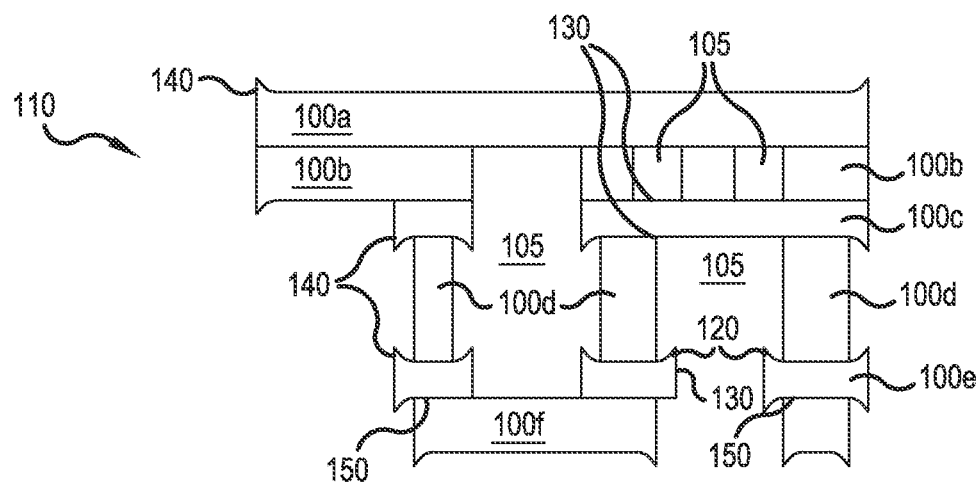
FIG. 1 shows a sectional view of a section of a fluid-tight unit, which was produced without the use of a first exemplary embodiment of the present invention.

In the following description of the preferred exemplary embodiments of the present invention, the same or similar reference characters are used for the elements with a similar action and shown in the different drawings, whereby a repeated description of these elements is omitted. Further, the figures in the drawings, the description thereof, and the claims contain numerous features in combination. It is clear in this case to a person skilled in the art that these features can also be considered individually or they can be combined into additional combinations not explicitly described here. Furthermore, the invention in the following description is explained by using different sizes and dimensions, whereby the invention is not to be understood as limited to these sizes and dimensions. If an exemplary embodiment comprises an "and/or" conjunction between a first feature and a second feature, then this can be read such that the exemplary embodiment according to an embodiment has both the first feature and the second feature and according to another embodiment either only the first feature or only the second feature.

FIG. 1 shows a sectional view of a section of a fluid-tight unit, which was produced without the use of an exemplary embodiment of the present invention. In this case, sheets solder-plated on one side are used as the first component with burrs on the unplated side. In FIG. 1, individual sheets 100 *a-f* are shown by way of example, which are oriented horizontally and provided with openings 105 and which are connected together to form fluid-tight unit 110. A fluid-tight unit 110 is understood here to be a unit in which the connection sites between individual components (i.e., here sheets 100) are impermeable to a fluid (for example, a gas or a liquid). Before connection of individual sheets 100 into fluid-tight unit 110, said sheets must usually be cut, however, to the respectively required dimensions. In such a cutting to size, which is carried out, for example, with metal shears, cutting burrs 120 arise, however, which project from a (main) surface of the corresponding sheet 100. To carry out an application of solder to the soldering sites that is as simple as possible, sheets, which already have solder plating on one side, can be used for the cutting to size. As a result, a process step of the application of solder to the corresponding contact areas on one of the components to be connected can be avoided, as a result of which production costs for the production of the fluid-tight unit can be reduced.

According to a first embodiment of the invention, the use of sheets possibly solder-plated on one side is proposed. As a result, it is possible in almost all mechanical cutting processes to select the cutting process so that cutting burr 120 comes to lie on the unplated side. In this way, a planar, i.e., economic mechanical burr removal on the unplated side is possible. This is often used also for the removal of oxides after a longer storage period. If burrs 120 are not removed, said burrs upon joining of the sheets, for example, sheets 100*b* and 100*c* in FIG. 1, can produce a gap at the connecting sites, which leads to a poor or faulty connection/soldering. If the present invention according to an embodiment is used, however, before the connection of sheet 100*b* to the other sheet 100*c*, a planar removal 130 of cutting burrs 120 of sheet 100*b* on a main surface can occur, which faces the other sheet 100*c* (see FIG. 2). If now no solder plating is applied to this main surface of sheet 100*b*, on which burrs 120 are removed, there is no danger that the solder is removed by the removal of cutting burrs 120. There need be no concern then about an insecure connection between sheets 100*b* and 100*c*. In this case, a solder plating on a main surface of the additional sheet 100*c* should be arranged to provide the connecting site with a sufficient solder amount for the soldering. In summary, it can be noted in regard to the first exemplary embodiment that in the case of parts solder-plated on one side cutting burr(s) 120 should be placed if possible on the unplated side of the component, so that cutting burrs can then be removed in a planar manner more easily and thereby cost-effectively; otherwise, the solder may be removed.

Figure 11:
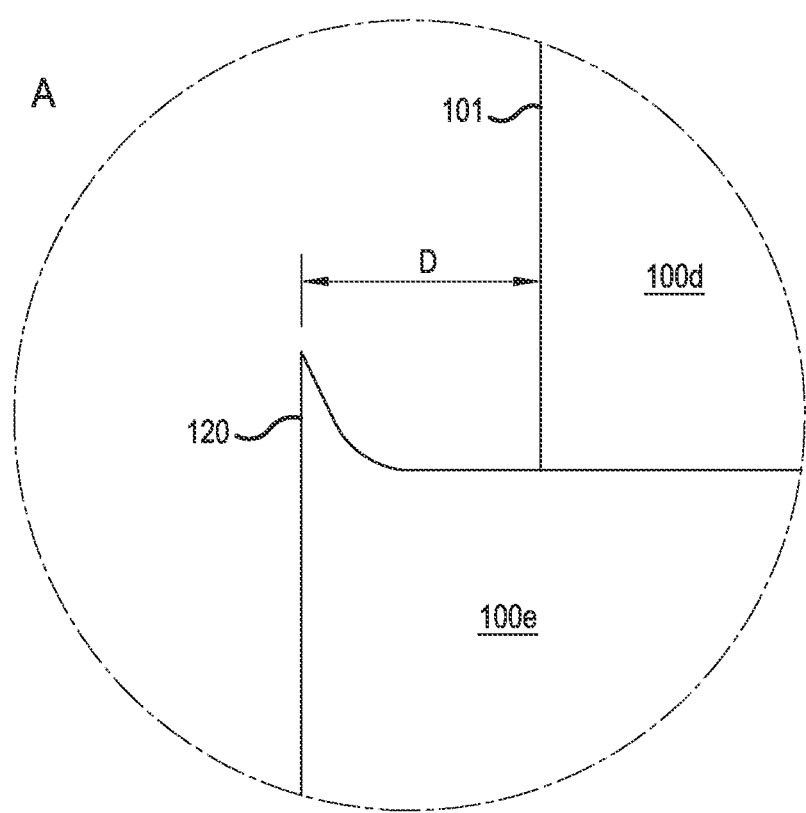
FIG. 11 is a close-up view of area A of FIG. 2.

Another approach for keeping cutting burrs 120 out of a connection area between the individual sheets 100 according to another exemplary embodiment of the invention can be that a contour overhang (projection) 140 is provided in one of the sheets, from which cutting burrs 120 project. This is also evident from the sectional view according to FIG. 2. Cutting burrs 120 thereby extend into emptiness and no longer interfere with a connecting area between the individual sheets 100. It is thereby proposed according to a second exemplary embodiment to use in a sheet layer (e.g., sheet layer 100*c*) a projection 140 of cutting burrs 120 to the sheet layer 100*b* or 100*d* lying below or above, such that the cutting burrs 120 are arranged by at least a predefined distance D from a side surface 101 of the sheet layer lying below or above (preferably in the range from 0.5 to 3 mm) (see FIG. 11). In the 90° angle, resulting overall thereby, between the different sheets 100 (for example, at sites 150), a defined solder meniscus can form because of the improved capillary forces. A possibly present cutting burr 120 need not be removed, because it extends "into emptiness." This produces a cost advantage. If due to the design a sheet solder-plated on both sides must be used, this is of particular advantage, because here the inevitably arising burrs cannot be removed in a planar manner, because otherwise the solder layers would also be removed. A selective burr removal is therefore necessary and accordingly costly.

Figure 2:
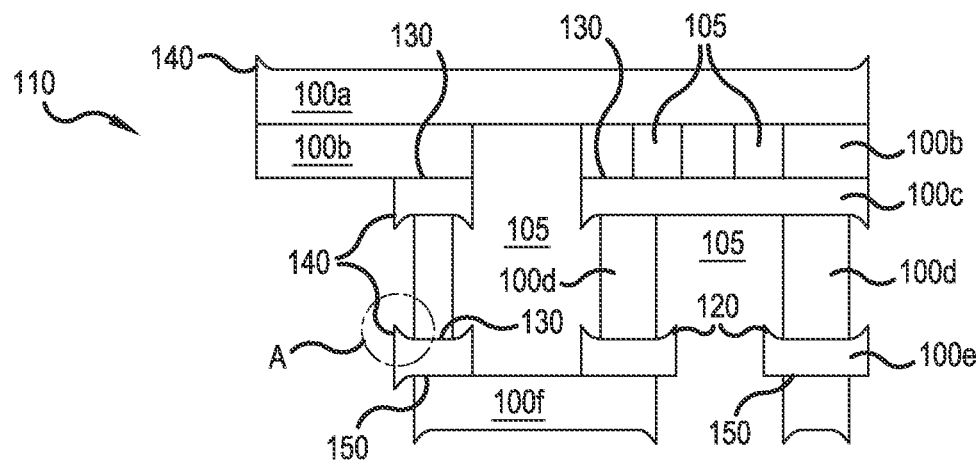
FIG. 2 shows a sectional view of a section of a fluid-tight unit, which was produced with use of the first and a second exemplary embodiment of the present invention.

FIG. 2 shows a sectional view of a section of a fluid-tight unit, which was produced, among others, with the use of the second exemplary embodiment of the present invention. Here, a planar removal 130 of cutting burrs 120 in one of the sheet layers (sheet layer 100*b*) was carried out before the soldering of the sheet layers, so that cutting burrs 120 are not able to have a negative effect during the formation of the soldering sites.

Figure 3:
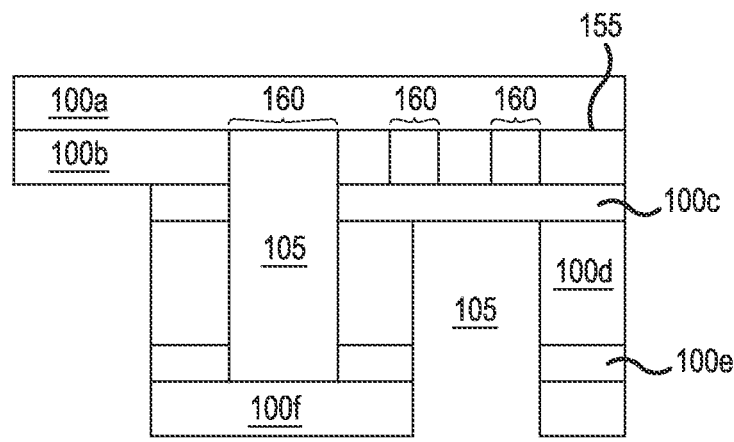
FIG. 3 shows a sectional view of a section of a fluid-tight unit, which was produced with the use of another exemplary embodiment of the present invention.

FIG. 3 shows a sectional view of a section of a fluid-tight unit, which was produced with the use of another exemplary embodiment of the present invention. In an exemplary embodiment of this kind, the solder can be cut out with the channel structure. In particular, the solder, which is applied in the form of a solder plating 155 to a (main) surface of a component (for example, of sheet 100*a*), can be removed in areas 160 (i.e., the solder plating is opened or removed at these sites) where a counterpart (here sheet 100*b*) has an opening 105 or a recess, in order to form a fluid channel in fluid-tight unit 110 to be produced during the joining of the two components. It is thereby proposed, furthermore, to cut out the solder even before the actual soldering of the individual sheets 100 with the channels 105 to be formed. As a result, excess solder and thereby unwanted channel narrowing or channel obstructions are avoided especially in the channels.

Figure 4:
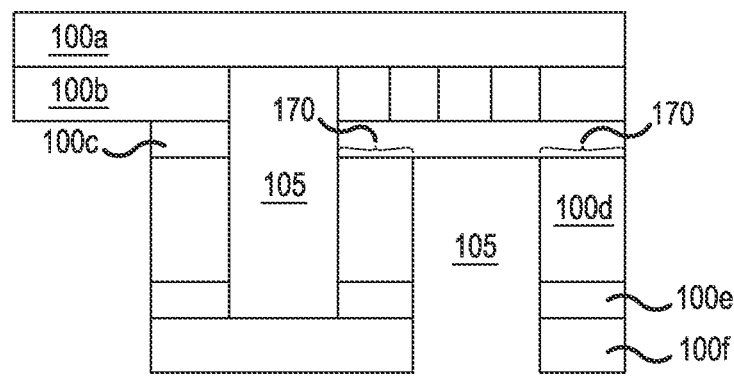
FIG. 4 shows a sectional view of a section of a fluid-tight unit, which was produced with the use of another exemplary embodiment of the present invention.

Another exemplary embodiment is shown in FIG. 4, which represents a sectional view of a section of a fluid-tight unit, produced with use of another exemplary embodiment of the present invention. According to this exemplary embodiment, a planar soldering at contact sites 170 is avoided, at which two components to be connected (for example, sheet 100c and 100d) are connected together in a bonding manner by the soldering (as a joining technique). Because according to this exemplary embodiment it is proposed to avoid planar soldering areas preferably in an area wider than 10 mm, it is prevented that impurities cannot degas during the soldering. This could sometimes lead to faulty soldering. Further, a considerably saving of weight is possible by the creation of hollow spaces 180 or the cutting out of material at places where it is not needed.

FIG. 5 shows a sectional view of a section of a fluid-tight unit, which was produced with the use of another exemplary embodiment of the present invention. In this case, openings (or at least side edges of the components) in different components 100a or 100b were achieved by a "conical stamping." The joining of the individual sheets 100a and 100b occurs in such a way that burrs 120 of layer sheets 100a and 100b, lying one on top of another, "extend into emptiness." Thereby, improved soldering of the individual layer sheets 100a and 100b can be assured, because burrs 120 do not lie directly above one another.

The described exemplary embodiments are selected only by way of example and can be combined with one another, as a person skilled in the art can easily realize.

According to another exemplary embodiment of the present invention, a method 600 is proposed for the fluid-tight connection of two components for producing a fluid-tight unit, as is shown in the flowchart according to FIG. 6. In this case, the method 600 comprises a first step of the provision 610 of at least one first component, which is solder-plated on one side, whereby the first component has a cutting burr on a side facing away from the solder-plated surface. Further, the method comprises another step of the fluid-tight connection (620), particularly soldering, of the first component to a second component to produce the fluid-tight unit, whereby during the fluid-tight connection of the first and second component the solder-plated surface of the first component faces the second component.

In FIG. 7A a flowchart of another exemplary embodiment of the present invention is shown as a method 700 for the fluid-tight connection of two components for producing a fluid-tight unit. A method 700 of this kind comprises a step of the provision 710 of at least one first component, which has a cutting burr on a main surface. Further, the method 700 comprises another step of the joining 720 of the first component to at least one second component, whereby the joining occurs in such a way that a main surface of the second component is in contact with the main surface of the first component and the cutting burr is arranged by at least a predefined distance from a side surface of the second component. Finally, the method comprises another step of the fluid-tight connection 730, particularly of the soldering of the first and second components to produce the fluid-tight unit.

Figure 8:
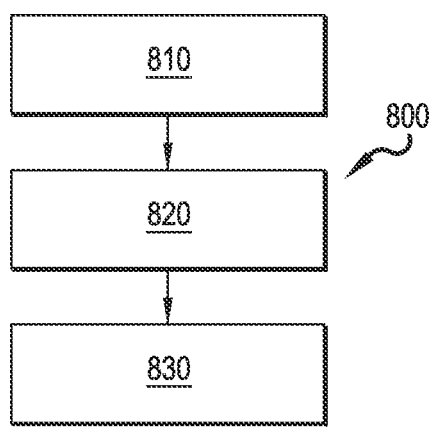
FIG. 8 shows a flowchart of another exemplary embodiment of the present invention as a method.

FIG. 8 shows a flowchart of another exemplary embodiment of the present invention as a method 800 for the fluid-tight connection of two components for producing a fluid-tight unit. The method 800 comprises a step of the provision 810 of a first component with a conical side cut, whereby the first component has a cutting burr, which projects from the main surface of the first component that has a smaller angle to the side cut. A side cut in the present description can also be understood to be a side (cut) edge or edge of an opening of the component. Further, the method 800 comprises another step of the provision 820 of a second component with a conical side cut, whereby the second component has a cutting burr, which projects from the main surface of the second component that has a smaller angle to the side cut. Finally, the method 800 comprises a third step of the fluid-tight connection 830 of the first component to the second component to produce the fluid-tight unit, whereby the cutting burr of the first component is aligned substantially with the cutting burr of the second component and the cutting burr of the second component is arranged on the main surface, facing away from the first component, of the second component.

Figure 9:
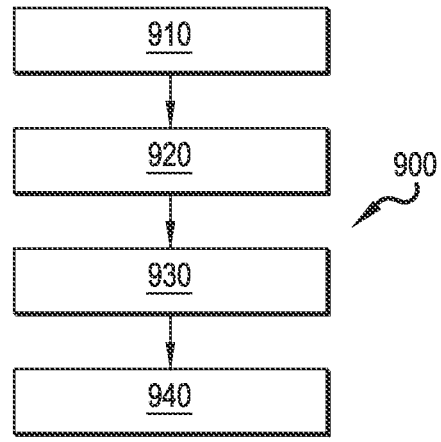
FIG. 9 shows a flowchart of another exemplary embodiment of the present invention as a method.

FIG. 9 shows a flowchart of another exemplary embodiment of the present invention as a method 900 for the fluid-tight connection of two components for producing a fluid-tight unit. In this case, the method 900 comprises a step of the provision 910 of at least one first component, which has at least one recess or opening. Further, the method 900 comprises a step of the provision 920 of at least one second component, which has solder plating on at least one side, whereby the solder plating has a plating opening in at least one area. A plating opening in this case can be understood to be an area on the surface of the second component where the solder plating was removed. Further, the method 900 comprises a step of the joining 930 of the first component to a second component, whereby the recess or opening of the first component is aligned with the plating opening of the second component. Finally, the method 900 comprises a step of the fluid-tight connection 940, particularly of the soldering, of the first component to the second component to produce the fluid-tight unit.

Figure 10:
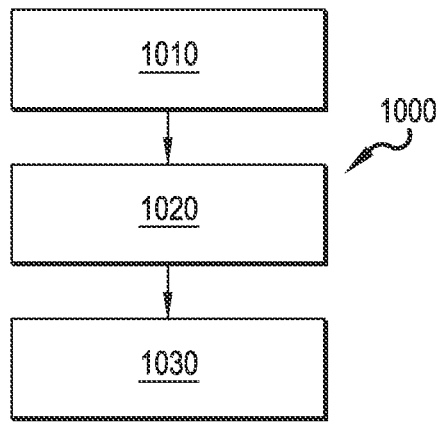
FIG. 10 shows a flowchart of another exemplary embodiment of the present invention as a method.

FIG. 10 shows a flowchart of another exemplary embodiment of the present invention as a method 1000 for the fluid-tight connection of two components for producing a fluid-tight unit. The method 1000 in this case comprises a step of the provision 1010 of at least one first component and a step of the provision 1020 of a second component which has at least one recess or opening, whereby the recess or opening is sized so that a contact area between the first and the second component has at most a dimension of 10 mm. Finally, the method 1000 comprises another step of the fluid-tight connection 1030, particularly of the soldering of the first and second component, to produce the fluid-tight unit, whereby during the connection the first component is connected in a bonding manner in the contact area to the second component and in an area of the recess the first component is not connected in a bonding manner to the second component.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for the fluid-tight connection of two components for producing a fluid-tight unit, the method comprising:
   providing at least one first component, which has a cutting burr on a main surface;
   joining the first component to at least one second component, the joining occurring such that a main surface of the second component is in contact with the main surface of the first component and such that the cutting burr is arranged by at least a predefined distance from a side surface of the second component; and connecting in a fluid-tight manner by soldering the first and second components to produce the fluid-tight unit, wherein during joining of the at least one first component to the at least one second component, the at least one first component is positioned such that a portion of the at least one first component overhangs beyond the side surface of the at least one second component, such that the at least one first component includes an overhang portion, and wherein the cutting burr is provided at the overhang portion such that the cutting burr does not contact the at least one second component when the at least one first component and the at least one second component are joined.

2. The method according to claim 1, wherein, in the step of joining, the cutting burr is arranged on the main surface of the first component at a distance of 0.5 mm to 3 mm from the side surface of the second component.

3. The method according to claim 1, wherein the step of joining is carried out in such a way that the side surface of the second component substantially forms an angle of 90° with the main surface of the first component or a main surface of another component.

4. The method according to claim 1, wherein the main surface of the at least one first component and a secondary surface of the at least one first component that opposes the main surface, are both solder plated prior to joining the at least one first component to the at least one second component.

* * * * *